United States Patent [19]
Sorkin et al.

[11] Patent Number: 5,898,823
[45] Date of Patent: Apr. 27, 1999

[54] NETWORK PRINTER AUTO-DETECTION METHOD AND SYSTEM

[75] Inventors: Maxim A. Sorkin, Canoga Park; Gregg Welker, Simi Valley; Scott H. Beckstead, Thousand Oaks; Tal Shaffar, Los Angeles; Mark P. Murphy, Canoga Park, all of Calif.

[73] Assignee: Dataproducts Corporation, Simi Valley, Calif.

[21] Appl. No.: 08/853,213

[22] Filed: May 8, 1997

[30] Foreign Application Priority Data

Jul. 4, 1996 [KR] Rep. of Korea .................. 96-19865

[51] Int. Cl.$^6$ ................................................ G06F 17/00
[52] U.S. Cl. ..................................... 395/114; 395/200.52
[58] Field of Search ................................. 395/284, 828, 395/835, 839, 200.6, 200.1, 200.12, 114, 200.52

[56] References Cited

U.S. PATENT DOCUMENTS 5,227,778  7/1993  Vacon et al. .
5,278,829  1/1994  Dunlap .
5,388,213  2/1995  Oppenheimer et al. .

FOREIGN PATENT DOCUMENTS 0 691 772 A2  10/1996  European Pat. Off. .

OTHER PUBLICATIONS

Adler, Richard M., "Distributed Coordination Models for Client/Server Computing", Computer, vol. 28, No. 4, Apr. 1, 1995, pp. 14–22.

*Primary Examiner*—Ellis B. Ramirez
*Assistant Examiner*—William Titcomb
*Attorney, Agent, or Firm*—Pillsbury Madison & Sutro LLP

[57] ABSTRACT

In an electronic network having a computer, a spooler and a printer, the network address of the printer is automatically detected by a method and a system in which a non-print job, which includes a job header identifying the sending computer, is generated by the computer and transmitted via the spooler to the printer. The printer responds by transmitting an acknowledgment which includes the network address of the printer, to the sending computer. The sending computer identifies and stores the printer address therein. Thereafter, the printer address stored at the computer can be used to provide direct communications with the printer, for purposes of certain printer related functions such as determining the printer configuration or set-up, or monitoring the printer.

15 Claims, 5 Drawing Sheets

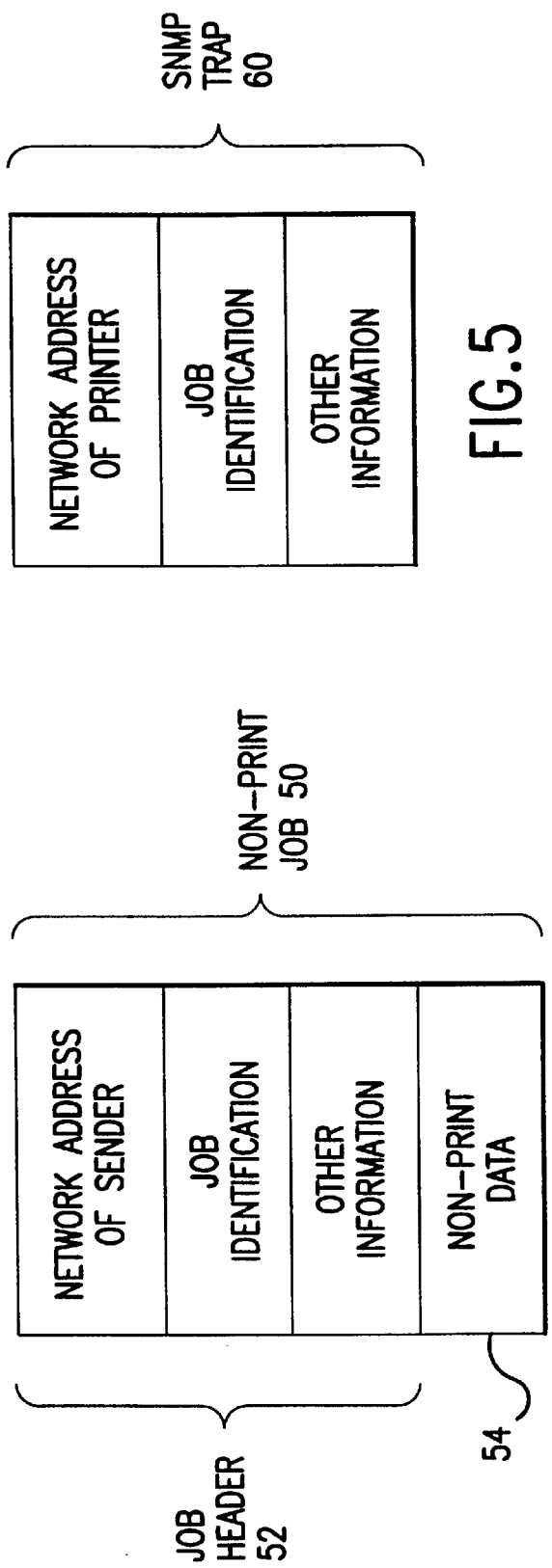
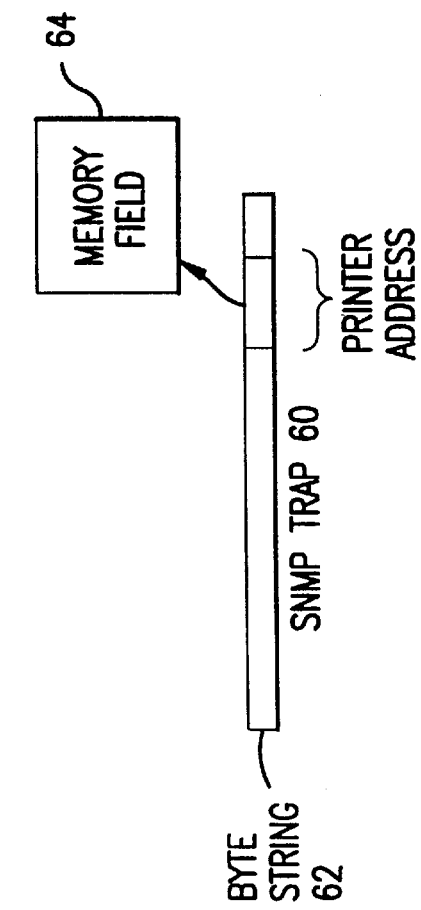

NETWORK PRINTER AUTO-DETECTION METHOD AND SYSTEM

BACKGROUND OF THE INVENTION

1. Field of the Invention

The present invention relates to electronic networks having a plurality of client or agent terminals or systems, and more particularly to networks having one or more printers used by computers or other printer users within the network.

2. History of the Prior Art

Electronic networks are known in which a plurality of client terminals or systems are coupled to the network and communicate with each other. The client terminals can comprise various types of systems such as a PC (personal computer), a printer, a router, a bridge, a tape drive, and the like.

While different types of protocols are possible for status monitoring and configuration of devices within an electronic network, one of the most common protocols is the Simple Network Management Protocol (SNMP). This is an open protocol for network management applications. The protocol is of the request-response type, and is typically carried out between a manager and an agent or client. The client may send asynchronous messages or "traps" to a management application.

In a typical electronic network, a plurality of clients in the form of computers are coupled to the network together with one or more printers and an intermediate spooler. Job requests for printing are transmitted by the client computers to the spooler which then stores spooled jobs in queues in the form of a scheduling list of print jobs to be done. The spooler then routes the job request to the printer.

Most print job requests involve one-way communication in the sense that they are sent by the sending computer to the spooler using the known address of the spooler. The spooler then controls transmission of the job request to the printer. The network address of the printer is not normally known to the sending computer, so that direct communications from the sending computer to the printer are not possible. Instead, communications from the sending computer to the printer are made by way of the spooler.

Often, it becomes necessary or desirable to communicate directly with the printer, in order to accomplish special functions such as determining the configuration of the printer, the set-up of the printer or monitoring the printer. Where such occasions arise, it becomes necessary to determine the network address of the printer so that the sending computer can communicate directly with the printer. There are several ways of determining the network address of the printer, which are essentially manual in nature. One such technique is to contact the system administrator. The printer address can be determined by looking up the spool queue set-up notes. Alternatively, spooler specific utilities can be used to determine the network connection used by the queue to communicate with the printer. This technique requires different software for each spooler system type. Sometimes the printer address cannot be determined accurately, even with such software tools.

Accordingly, it would be desirable to provide a mechanized or automated method and system within the network for determining the network address of the printer, when direct access to the printer is needed to perform specialized functions such as configuration, set-up or monitoring the printer. Such method and system should not rely upon complex hardware and should not require human intervention so as to determine the printer address such as by manual means.

BRIEF DESCRIPTION OF THE INVENTION

Methods and systems according to the invention provide for auto-detection of the network address of a printer or other client terminal within a network by generating and transmitting a job request to the printer or other client terminal by way of the server or other spooling system within the network. The job request is routed by the spooler to the printer or other client terminal, which responds by transmitting an acknowledgment back to the sending client. The acknowledgment includes the network address of the printer or other client terminal. At the sending client, the address of the printer or other client terminal is identified and stored for future use. Thereafter, when the need arises to access the printer or other client terminal directly, the address of the printer or other client terminal is used.

In a more specific example of an electronic network utilizing the methods and systems of the invention, one or more clients in the form of computers are coupled through an intermediate spooler to one or more printers. To determine the network address of a printer, a non-print job request is generated by a computer and is transmitted to the spooler. The non-print job is comprised of a job header and non-print data. The job header includes the network address of the sending computer, along with job identification and other information. The non-print job is routed by the spooler to the printer. The printer acknowledges receipt of the job by transmitting an acknowledgment back to the sending computer. The acknowledgment includes the network address of the printer, as well as the job identification and other information. Because the job request includes non-print or "dummy" print data, no printing is performed at the printer. When the acknowledgment is received at the sending computer, the included network address of the printer is identified by the computer and is stored in a memory field thereof for future use. Thereafter, when the need arises to send communications directly to the printer, such as when functions like configuration, set-up or printer monitoring are to be performed, the network address of the printer is retrieved from the memory field and is used to bypass the spooler and provide direct accessing of the printer.

Where SNMP protocol is used in the network, the acknowledgments comprise traps which are generated by the printer and sent to the sending computer in the form of a string of bytes. The network address of the printer occurs at a certain known location within the string of bytes. Consequently, identification and storage of the network address of the printer is accomplished by stripping off and storing from the string of bytes of the trap those bytes defining the network address of the printer.

BRIEF DESCRIPTION OF THE DRAWINGS

A detailed description of the invention will be made with reference to the accompanying drawings, in which:

FIG. 4 is a representation of a non-print job which is generated and transmitted by a sending client in accordance with the invention;

FIG. 5 is a representation of an acknowledgment trap generated and transmitted by a printer to the sending client in response to the non-print job shown in FIG. 4;

FIG. 6 depicts the acknowledgment trap of FIG. 5 in the form of a byte string, and showing the manner in which a portion thereof is stripped therefrom and stored in a memory field as the network address of the printer;

DETAILED DESCRIPTION

Figure 1:
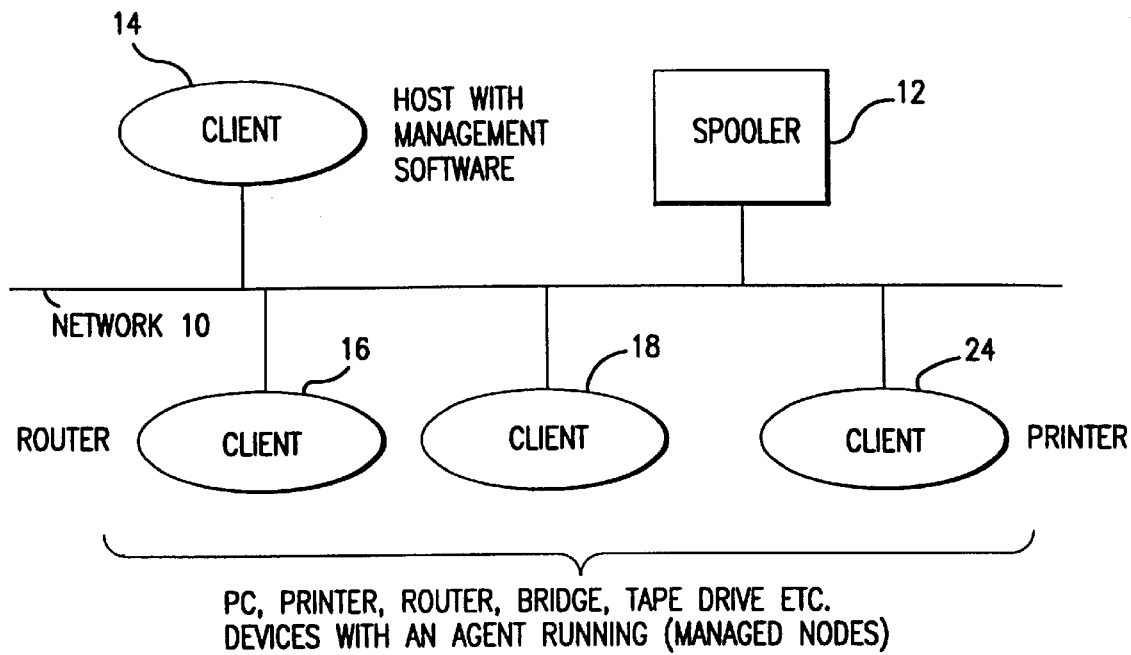
FIG. 1 is a block diagram of an electronic network of the type in which an auto-detection method and system according to the invention can be used.

FIG. 1 shows an electronic network 10 of the type in which a method and a system in accordance with the invention may be used. In describing the network 10 of FIG. 1, as well as the other figures of drawing hereafter, the use of the Simple Network Management Protocol (SNMP) is assumed, because of its common usage in networks of this type. However, it should be understood that other interface protocols can be used in accordance with the invention.

The network 10 includes a spooler 12 and a plurality of client terminals 14, 16, 18 and 24. The clients 14, 16, 18 and 24 can comprise such systems as a PC (personal computer), a printer, a router, a bridge, a tape drive, and the like. Where one of the clients 14, 16, 18 and 24 comprises a computer and another one of the clients comprises a printer, then as described hereafter, the computer client typically transmits job requests to the printer client by way of the spooler 12.

As shown in FIG. 1, and as described hereafter, the client 14 is assumed to be a host with management software, and the clients 16, 18 and 24 are assumed to be devices with an agent running (managed nodes). The client 16 is shown in FIG. 1 as a router, while the client 24 is shown in FIG. 1 and is described hereafter in terms of a printer.

Figure 2:
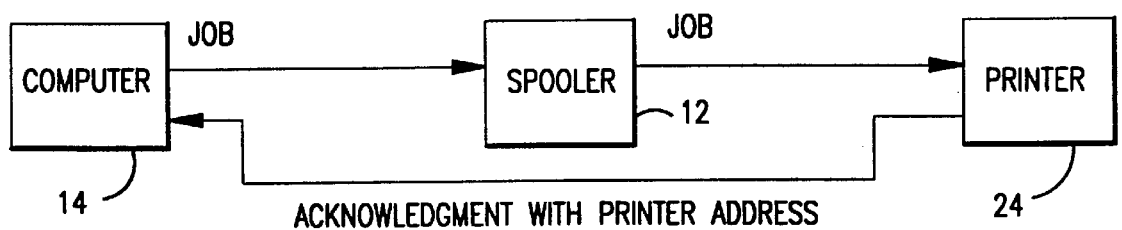
FIG. 2 is a block diagram representation of a portion of the network of FIG. 1, showing the manner in which job requests from a sending client are routed through a spooler to a receiving client terminal such as a printer, with the printer responding by sending acknowledgments back to the sending client.

FIG. 2 depicts a portion of the network 10 which includes the client 14, the spooler 12 and the client (printer) 24. In the example of FIG. 2, the client 14 is assumed to be a computer or other system (host) capable of generating and transmitting job requests to the printer 24 by way of the spooler 12. During use of the computer 14, the need occasionally arises to have data printed. When this occurs, the computer 14 generates and transmits a job request to the spooler 12. The network address of the spooler 12 is known to the computer 14, so that the job request is sent directly to the spooler 12. Transmission of the job request to the spooler 12 utilizes a spool queue in which a schedule list is made up of jobs to be performed. The spooler 12 further processes the job request and then transmits it to the printer 24.

In accordance with the invention, the printer 24 acknowledges receipt of the job request by transmitting an acknowledgment to the client 14. The job request transmitted by the computer 14 has a job header which includes the network address of the computer 14. Consequently, the printer 24 is able to identify the job request as coming from the computer 14 and to send the acknowledgment. Where the network 10 uses the SNMP protocol, the acknowledgment takes the form of a trap in which the address of the printer 24 is included.

In the arrangement of FIG. 2, communication between the computer 14 and the printer 24 is one-way in the sense that job requests generated by the computer 14 are always first transmitted to the spooler 12. The network address of the printer 24 is known by the spooler 12 but not by the computer 14. Consequently, communications from the computer 14 to the printer 24 are by way of the spooler 12. This is satisfactory for most job requests. Often, however, it may be desirable to accomplish certain special functions such as determining the configuration, the set-up or the monitoring of the printer 24. In such instances, it is necessary for the computer 14 to be able to directly access the printer 24. However, the computer 14 does not have the network address of the printer 24.

As previously noted, identification of the address of the printer 24 was previously obtained by essentially manual means such as looking up spool queue set-up notes or using complex and often unreliable software. In accordance with the invention, however, the network address of the printer 24 is automatically determined by a method and system in which a job request is communicated by the spooler 12 to the printer 24 for the purpose of returning an acknowledgment from the printer 24 to the computer 14. The acknowledgment includes the network address of the printer 24, and the computer 14 identifies and stores the network address of the printer 24. Subsequently, the network address of the printer 24 is available for direct accessing of the printer 24 by the computer 14. Such method and system are described in greater detail hereafter in connection with FIGS. 3–8.

Figure 3:
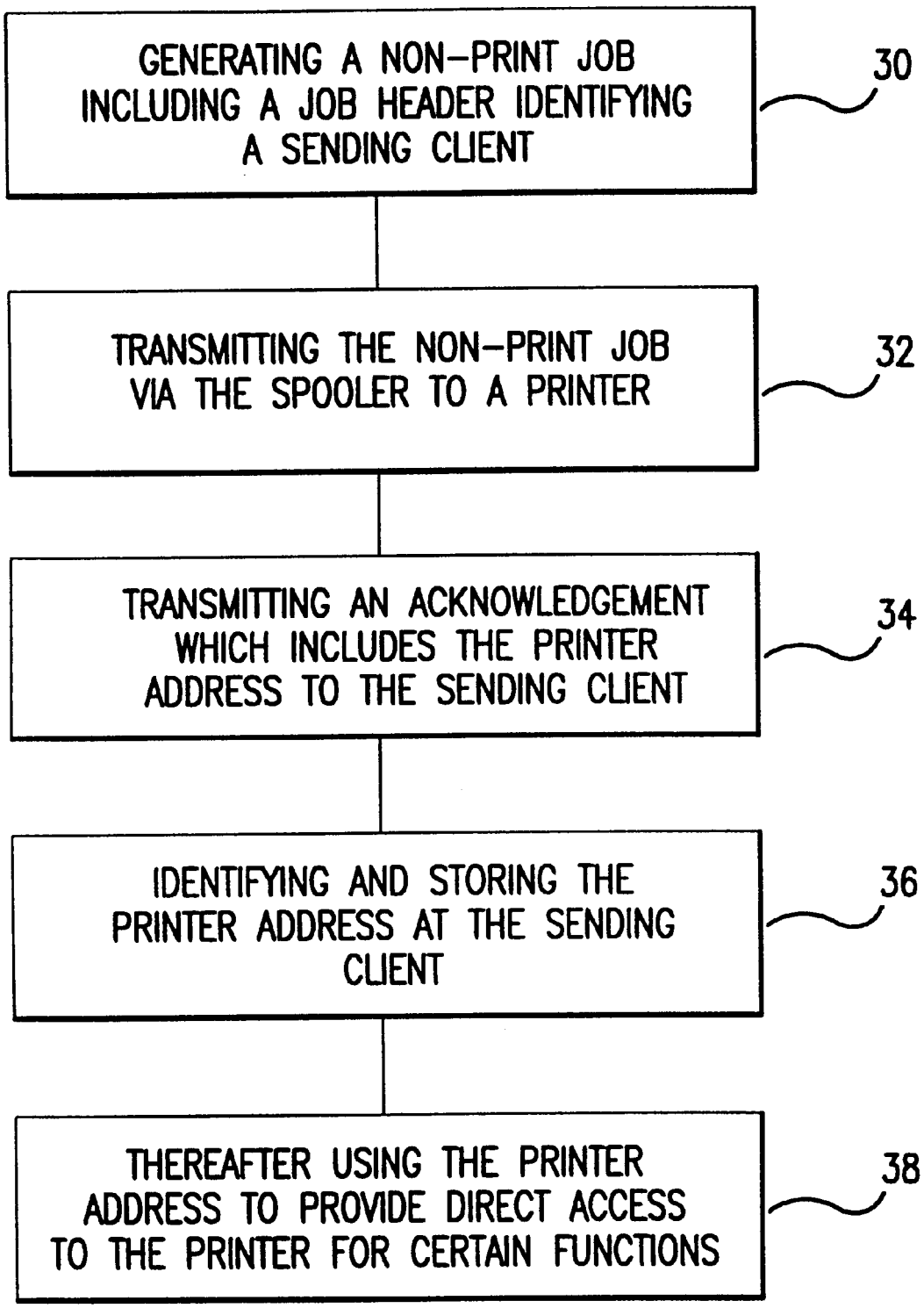
FIG. 3 is a block diagram of the successive steps of a method of auto-detection of the network address of a printer, in accordance with the invention.

FIG. 3 shows the successive steps in a preferred method according to the invention. In a first such step 30, a non-print job is generated by the sending client such as the computer 14. The non-print job includes a job header which identifies the computer 14.

In a second step 32, the non-print job is transmitted via the spooler 12 to the printer 24, in the manner previously described.

In a third step 34, the printer 24 responds to receipt of the non-print job from the spooler 12 by transmitting an acknowledgment to the computer 14. The acknowledgment includes the network address of the printer 24.

In a fourth step 36, the computer 14 identifies and stores the network address of the printer 24. As described hereafter, the acknowledgment may comprise an SNMP trap in the form of a string of bytes, certain ones of which identify the network address of the printer 24. When the string of bytes is received at the computer 14, the bytes defining the network address of the printer 24 are detected and are stored in a memory field within the computer 14.

Thereafter, and in accordance with a fifth step 38 of FIG. 3, the stored network address of the printer 24 may be used to provide direct access by the computer 14 to the printer 24 in cases where certain functions require such direct access.

The generation and transmission of the non-print job will be better understood with reference to FIG. 4 which depicts the format of a typical non-print job 50 in accordance with the invention. The non-print job 50 includes a job header 52 together with non-print data 54. The job header 52 includes the network address of the sender, which in this case is the computer 14. There is also a job identification, and other information. The non-print data comprises "dummy" printing information in the sense that it does not result in any printing when received at the printer 24. This is because the non-print job 50 is generated and transmitted for the purpose of receiving an acknowledgment from the printer 24 so that the network address of the printer 24 can be identified and stored at the computer 14.

The printer 24 acknowledges receipt of the non-print job 50 by transmitting an acknowledgment to the computer 14.

The acknowledgment is shown as an SNMP trap 60 in FIG. 5. As shown in FIG. 5, the SNMP trap 60 includes the network address of the printer 24, together with job identification and other information. The sending computer 14 detects and stores the network address of the printer contained in the SNMP trap 60. Detection and storage of the network address of the printer 24 is illustrated in FIG. 6.

In FIG. 6, the SNMP trap 60 is shown as comprising a byte string 62. The string 62 is typically two hundred or more bytes in length. Moreover, it is known that the printer address begins at a particular byte location along the string 62. Consequently, the computer 14 detects those bytes within the string 62 which identify the printer address, and stores such bytes in a memory field 64. Thereafter, the computer 14 retrieves the network address of the printer 24 each time it is necessary to provide direct access by the computer 14 to the printer 24.

Figure 7:
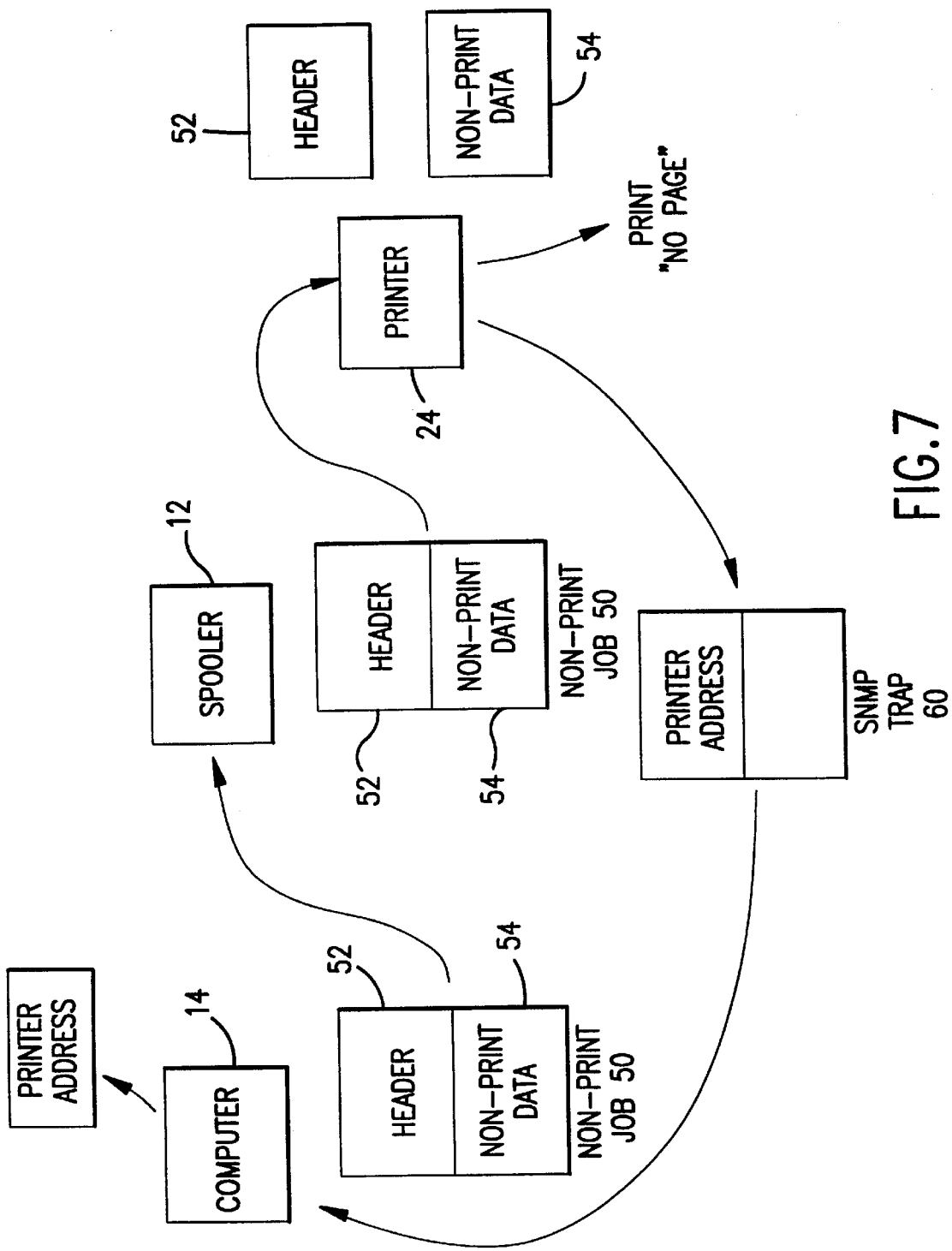
FIG. 7 is a detailed block diagram of a network further illustrating the method and system in accordance with the invention.

The method and system in accordance with the invention are shown in greater detail in the block diagram of FIG. 7. As shown in FIG. 7, the computer 14 begins by generating the non-print job 50, including the job header 52 and the non-print data 54. The non-print job 50 is transmitted to the spooler 12, and then by the spooler 12 to the printer 24. After examining the job header 52 and determining the information contained therein, including the network address of the sending computer 14, the job header 52 is discarded by the printer 24. The non-print or "dummy" print data 54 is examined, and a determination is made that no printing is to take place.

The printer 24 sends the acknowledgment trap 60 to the computer 14. The trap 60 includes the network address of the printer 24. As described in connection with FIG. 6, the computer 14 detects the network address of the printer 24 in accordance with the appropriate positions within the byte string 62 of the trap 60, and stores the network address of the printer 24 in the memory field 64 of the computer 14. Thereafter, the printer address may be used to achieve direct access of the printer 24 by the computer 14, when needed.

Figure 8:
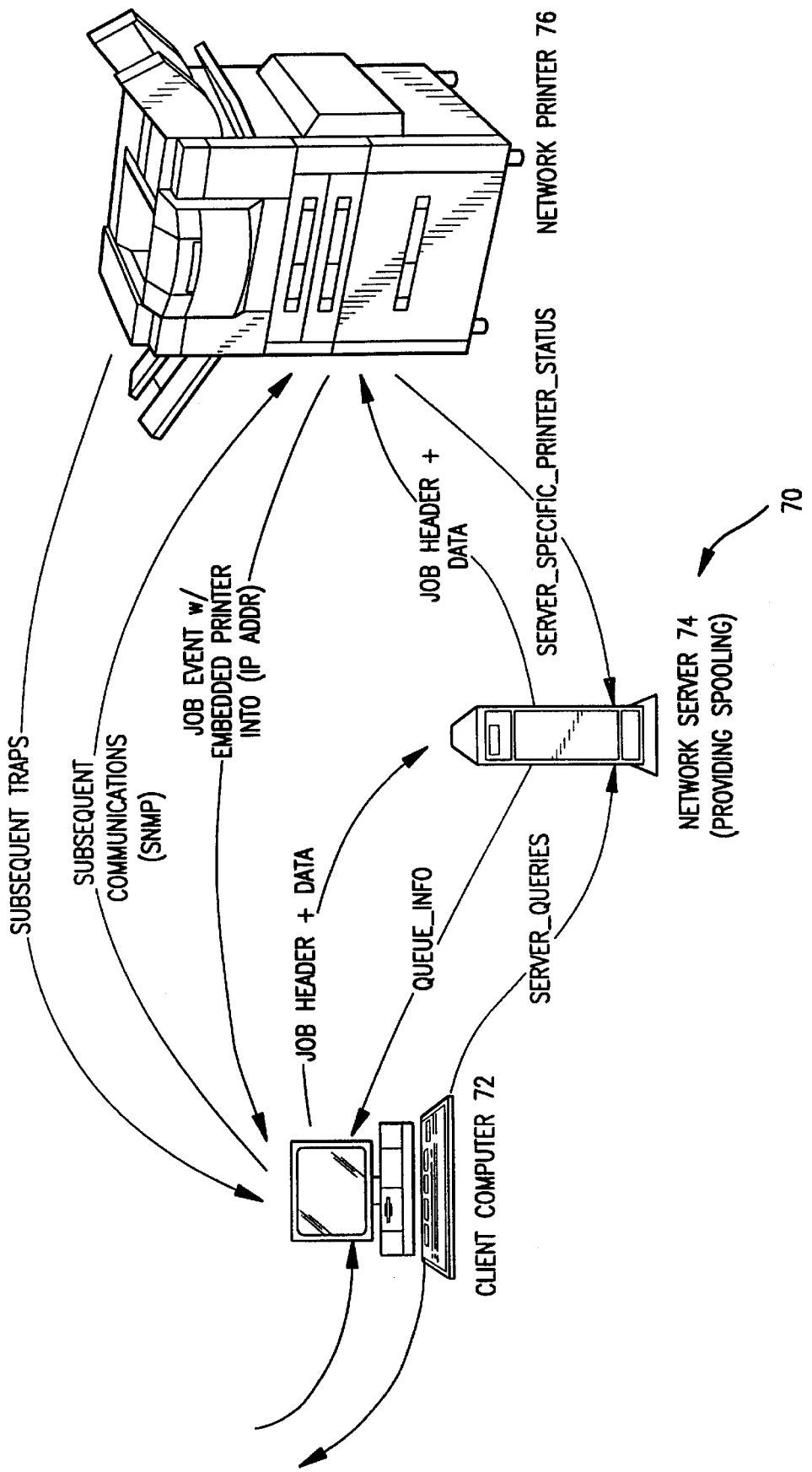
FIG. 8 is a still more detailed block diagram of a network further illustrating the method and system in accordance with the invention.

FIG. 8 provides a detailed example of a network 70 which employs a method and a system in accordance with the invention. The network 70 includes a client computer 72, a network server 74 and a network printer 76. The network server 74 provides spooling, and therefore functions as the spooler 12 in the prior figures of the drawings.

As shown in FIG. 8, the client computer 72 generates a job, which includes a job header and data, and transmits such job to the network server 74. The network server 74, in turn, sends the job header and data to the network printer 76. The network printer 76 acknowledges the job event with an acknowledgment trap that is sent to the client computer 72. Embedded in the trap is information on the network printer 76 including particularly the network or IP (Internet) address. The client computer 72 also transmits server queries to the network server 74. The network printer 76 may transmit server specific printer status information to the network server 74. Having determined the network address of the printer 76 and stored the same in a memory field, the client computer 72 can thereafter directly access the network printer 76, when desired.

Attached hereto as Exhibit A is the source code which relates to various steps performed by the computer 14 and the printer 24 in an example of the invention. The source code of Exhibit A is incorporated herein and made a part of this disclosure. In the example of Exhibit A, the computer 14 is an IBM-compatible PC running MS DOS 6.2, Windows For Work Group 3.11. The printer 24 is a Model DDS 24 laser printer manufactured by Dataproducts Corporation.

Referring to Exhibit A, pages 1 and 2 thereof set forth the software in the printer for identifying a job request and sending an acknowledgment to the computer. Page 3 sets forth the basic algorithm at the computer. Pages 4 and 5 set forth the software in the computer for generating a non-print job. Page 6 sets forth the software for routing the non-print job through the spooler. Pages 7–10 set forth the software for receiving an acknowledgment at the computer and identifying and storing the network address of the printer therein.

While the invention has been particularly shown and described with reference to preferred embodiments thereof, it will be understood by those skilled in the art that various changes in form and details may be made therein without departing from the spirit and scope of the invention.

What is claimed is:

1. In a network in which a sending client terminal transmits data via an intermediate spooling system to a receiving client terminal, a method of detecting the network address of the receiving client terminal comprising the steps of:

generating a job at the sending client terminal;

transmitting the job via the spooling system to the receiving client terminal;

responding to receipt of the job at the receiving client terminal by transmitting to the sending client terminal an acknowledgment which contains the network address of the receiving client terminal;

detecting and storing the network address of the receiving client terminal at the sending client terminal; and thereafter using the stored network address of the receiving client terminal to communicate directly between the sending client terminal and the receiving client terminal.

2. The method set forth in claim 1, wherein the step of generating a job includes the step of generating a job header which includes the network address of the sending client terminal.

3. The method set forth in claim 1, wherein the acknowledgment comprises a string of bytes including bytes defining the network address of the receiving client terminal, and the step of detecting and storing comprises detecting within the string of bytes the bytes defining the network address and storing the bytes defining the network address in the memory.

4. The method set forth in claim 1, wherein the receiving client terminal comprises a printer, and the step of generating a job comprises generating a non-print job.

5. In a network having a computer, a spooler and a printer, a method of auto-detecting the network address of the printer for subsequent use by the computer in directly addressing the printer, comprising the steps of:

generating a job at the computer and transmitting the job via the spooler to the printer;

responding to the receipt of the job at the printer by transmitting an acknowledgment from the printer to the computer, the acknowledgment including the network address of the printer;

detecting the network address of the printer at the computer and storing the network address for future use by the computer;

and thereafter using the stored network address of the printer to communicate directly from the computer directly to the printer.

6. The method set forth in claim 5, wherein the step of generating a job includes the step of generating a job header which includes the network address of the computer.

7. The method set forth in claim 5, wherein the step of generating a job includes the step of generating non-print data so that when the printer responds to the receipt of the job, no printing takes place.

8. The method set forth in claim 5, wherein the network includes SNMP protocol and the acknowledgment transmitted by the printer comprises an SNMP trap.

9. The method set forth in claim 5, wherein the acknowledgment comprises a string of bytes, certain ones of which identify the network address of the printer, and the step of detecting and storing the network address of the printer comprises detecting the bytes of the string of bytes which identify the network address of the printer and storing the bytes which identify the network address of the printer in a memory field in the computer.

10. A network comprising the combination of a spooling system and a plurality of client terminals, a first one of the plurality of client terminals including means for generating and transmitting data via the spooling system to a second one of the plurality of client terminals, the second one of the plurality of client terminals including means for transmitting an acknowledgment to the first client terminal in response to receipt of transmitted data from the first client terminal, the acknowledgment including the network address of the second client terminal, and the first client terminal including means responsive to receipt of the acknowledgment from the second client terminal for auto-detecting and storing the network address of the second client terminal.

11. A network in accordance with claim 10, wherein the means for generating and transmitting data via the spooling system to a second one of the plurality of client terminals includes means for generating a job header which includes the network address of the first one of the plurality of client terminals.

12. A network in accordance with claim 10, wherein the means for auto-detecting and storing includes means for identifying a group of bytes within a string of bytes of the acknowledgment which comprise the network address of the second client terminal.

13. A network in accordance with claim 10, wherein the first client terminal comprises a computer and the second client terminal comprises a printer.

14. A network in accordance with claim 13, wherein the means for generating and transmitting data via the spooling system is operative to generate and transmit a non-print job, and wherein the printer responds to the non-print job by transmitting the acknowledgment and by not printing.

15. A network in accordance with claim 13, wherein the network includes SNMP protocol and the acknowledgment comprises an SNMP trap.

\* \* \* \* \*